United States Patent [19]

Cunningham

[11] 4,084,848
[45] Apr. 18, 1978

[54] SLIDING ROOF ASSEMBLY

[75] Inventor: Douglas James Cunningham, Steep Marsh, near Petersfield, England

[73] Assignee: Britax (Wingard) Limited, Chichester, England

[21] Appl. No.: 753,117

[22] Filed: Dec. 22, 1976

[30] Foreign Application Priority Data

Jan. 14, 1976 United Kingdom ............... 01407/76

[51] Int. Cl.² ............................................. B60J 7/02
[52] U.S. Cl. ............................................... 296/137 E
[58] Field of Search ............ 296/137 E, 137 B, 31 R, 296/31 P

[56] References Cited

U.S. PATENT DOCUMENTS

| 3,016,263 | 1/1962 | Rehmann | 296/137 E |
| 3,982,783 | 9/1976 | Vermeulen | 296/137 E |
| 3,993,348 | 11/1976 | Pizzuti | 296/137 E |

FOREIGN PATENT DOCUMENTS 899,815  6/1962  United Kingdom ............. 296/137 E Primary Examiner—Robert R. Song
Attorney, Agent, or Firm—J. Rodman Steele, Jr.

[57] ABSTRACT

A sliding roof assembly for insertion in an opening in a vehicle roof to form a so-called "sunshine roof". The assembly includes a support structure having an integral panel closing off the rear part of a frame and an integral flange extending around the periphery of the support structure to rest on the vehicle roof when the assembly is fitted. A roof panel slides into and out of a housing, the roof panel being guided in channel section members including interengageable flanges to lock the roof panel in a closed position which also strengthens the assembly.

9 Claims, 15 Drawing Figures

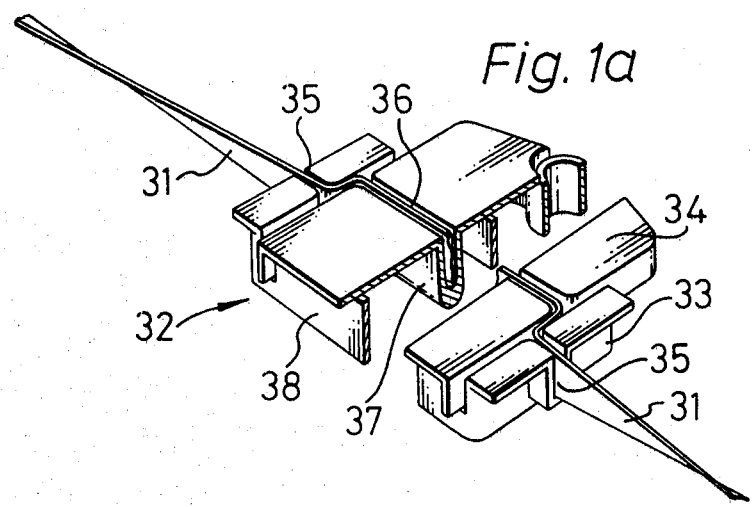
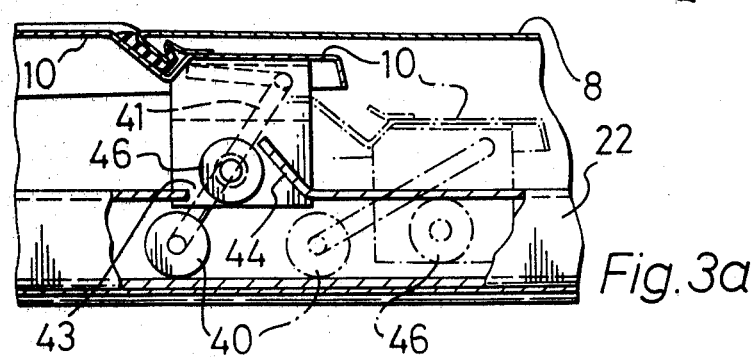
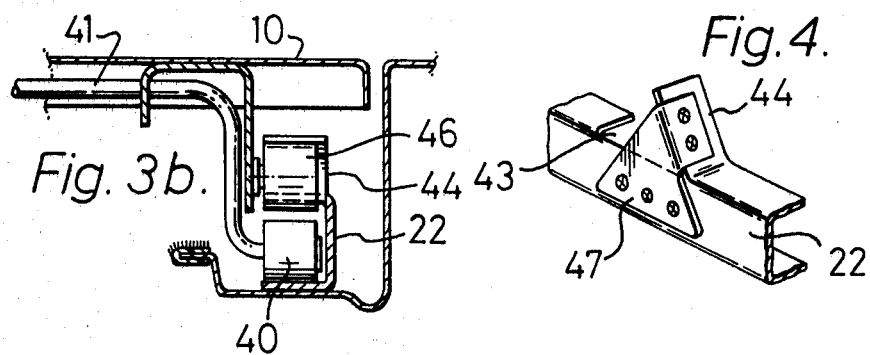

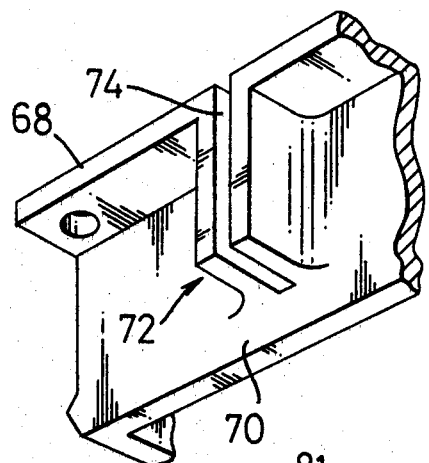
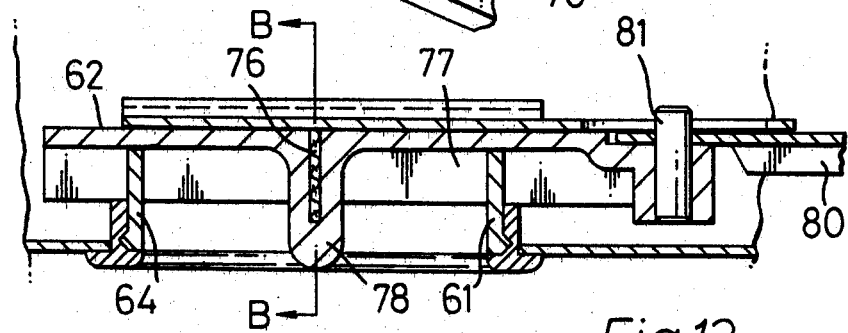
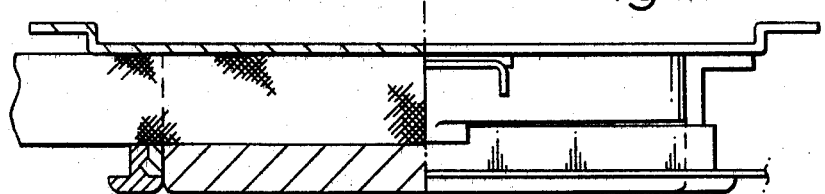
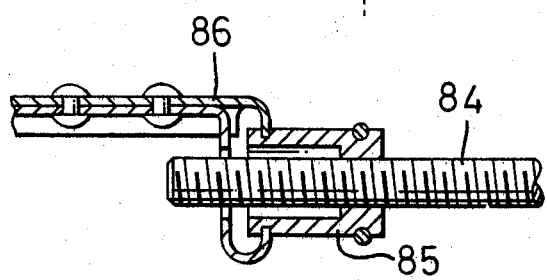

SLIDING ROOF ASSEMBLY

This invention relates to a sliding roof assembly for insertion in an opening in a vehicle roof, and to a vehicle with said assembly fitted thereto.

An object of this invention is to facilitate the fitting of a so called "sunshine roof" to a vehicle, particularly a saloon car, and thereby reduce the cost of providing and fitting a sunshine roof.

In some known constructions, the roof or closure panel is slidably supported in a frame which is the main structural B shaped member of the vehicle roof. A separate sheet metal pressing forms a lip around the hole cut in the roof and is attached to the frame. The present invention provides a sliding roof assembly of which the major structural part is of a one-piece construction, for example, a single pressing which includes an outwardly extending flange to seat on the outer surface of the vehicle roof. Thus, after cutting a hole of the correct dimensions in the vehicle roof, the assembly is simply inserted so that the outwardly directed flange is seated on the vehicle roof where it is secured by means such as concealed rivets fitted from the interior of the vehicle. The assembly may therefore be fitted quickly and easily, without the time and skill required in fitting sunshine roofs of conventional design.

More particularly, the present invention provides a sliding roof assembly for insertion in an opening in a vehicle roof, the assembly comprising an integral support structure of open rectangular shape having a pair of opposed side members and front and rear cross members, a panel closing off a rear half of the support structure and formed integral with the side members and the rear members, a flange formed integral with and projecting outwardly from the side members and the front and rear members, the flange extending around the periphery of the support structure and being provided to rest on the outer surface of the vehicle roof when the assembly is fitted thereto; a second panel secured to the support structure in overlapping but spaced relation to the first panel to define a recess, and a closure panel slidably mounted within the support structure and movable between a "closed" position, in which it closes an opening in the front half of the support structure and an "open" position in which it lies in the recess between the first and second panels.

In a preferred construction, the outwardly projecting flange slopes from an upstanding folded edge to a free edge which rests on the vehicle roof when the support structure is fitted. The outwardly directed flange may be fitted with a resilient seal which is compressed between the free edge and the vehicle roof when the support structure is anchored in position. The folded edge is integral with a wall which, in use, projects downwardly into the opening the vehicle roof.

Preferably, a lip projects inwardly from the free edge of the peripheral outwardly directed flange so as to facilitate fitting. Each lip may be a straight member having holes for receiving concealed rivets and extending alongside the outwardly directed flange adjacent the opposed side members and the front and rear cross members.

Preferably, an integral flange projects inwardly from the lower edge of the wall to improve the strength of the integral support structure and to provide a neat interior finish. The inwardly directed flange may be shaped to provide a peripheral rim defining the opening in the front half of the support structure, which rim is substantially parallel to the closure panel when it is in the closed position.

Preferably, the closure panel is slidably supported by channel section members attached to the opposed side members of the integral support structure. When the assembly is fitted to a vehicle roof, these channel section members extend fore and aft of the vehicle whereby the closure panel slidably mounted. A mid-portion of each of the channel section members can be cut and turned up to defined a ramp adjacent the inner edge of the first panel whereby the closure panel, preferably supported on rollers, is guided into the channel section members when it is moved from the closed to the open position. Preferably, the rollers are attached to the first panel by resilient means, such as a torsion spring, which is biased when the closure panel is moved from the open to the closed position. This helps to guide the rollers into the channel section members when the closure panel is moved from the closed to the open position.

Preferably, the rear edge of the closure panel and the inner edge of the first panel comprise interengageable re-entrant flanges which lock the closure panel in a closed position and which also strengthen the roof assembly. A compressible seal may be included which is compressed between the re-entrant flanges when the closure panel is closed.

Suitably, a handle is fitted to the closure panel for moving it between the closed and opened positions. Preferably, initial movement of the handle disengages a pair of latches which engage teeth in the channel section members so that the closure panel can be slid open or closed. This actuator generally comprises relatively movable parts which engage a flexible member having ends adapted for connection to respective latches, relative movement of said parts causing corresponding movement of said ends for operating the latches. In a preferred embodiment, movement of a handle simultaneously retracts the ends of a length of webbing connected to the respective latches. As movement of the handle in the intended direction of motion may cause the closure panel to accelerate away from the handle, whereupon the latches re-engage causing unpleasant chatter, a latch or latches are preferably employed to avoid this problem. A suitable latch mechanism generally comprises a member for engaging a recess or projection, the member being movable against a bias when disengaged, the arrangement being such that the bias is less than an initial bias maintaining said engagement when the member is disengaged. In a preferred embodiment, the bias is provided by a wire torsion spring which pivots bodily on a support when the latch mechanism is disengaged whereby the loading on the latch mechanism is reduced before closure.

An example of the invention will now be described with reference to the accompanying drawings in which:

FIG. 1a is a detailed perspective, partly sectioned view of the actuator,

Figure 1:
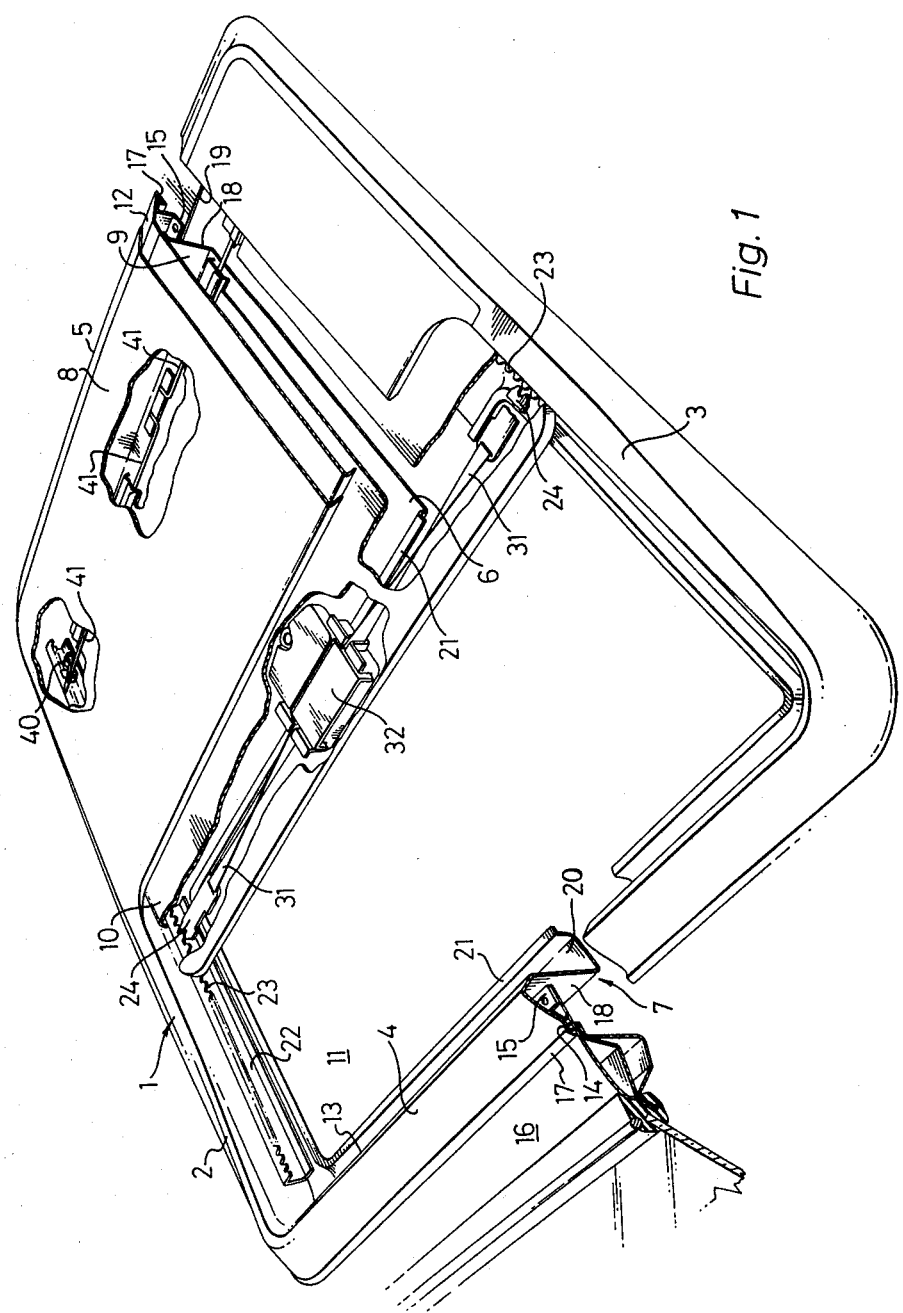
FIG. 1 is a perspective, partly sectioned view of a sliding roof assembly.
Figure 2:
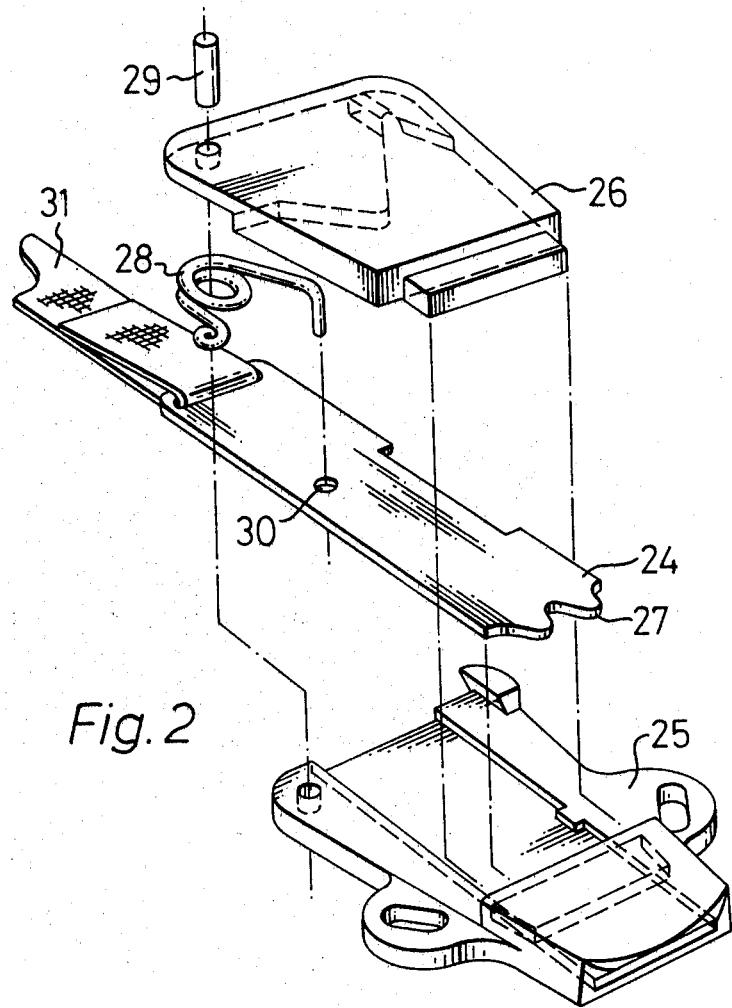
Figure 5:
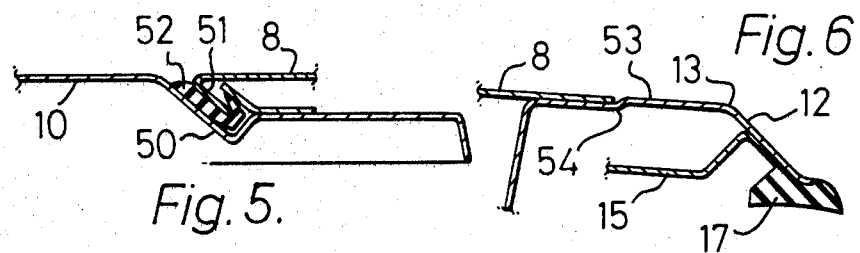
Figure 6:
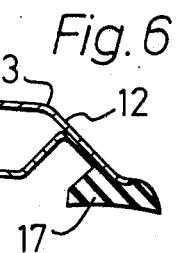
Figure 7:
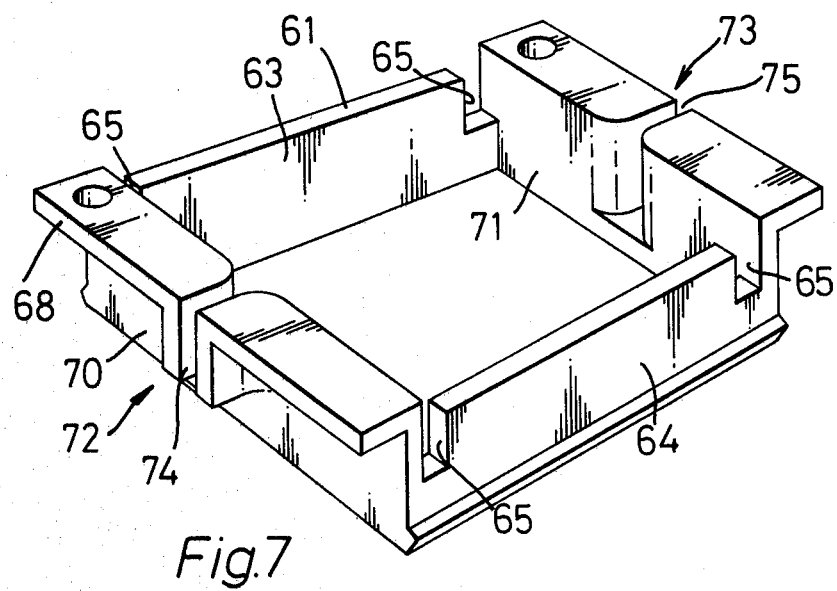
Figure 8:
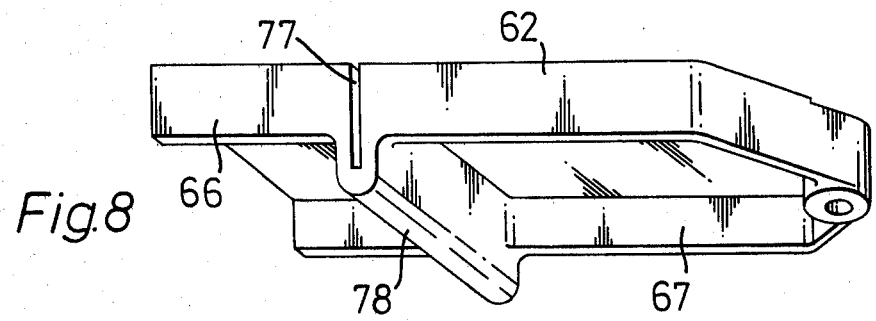
Figure 11:
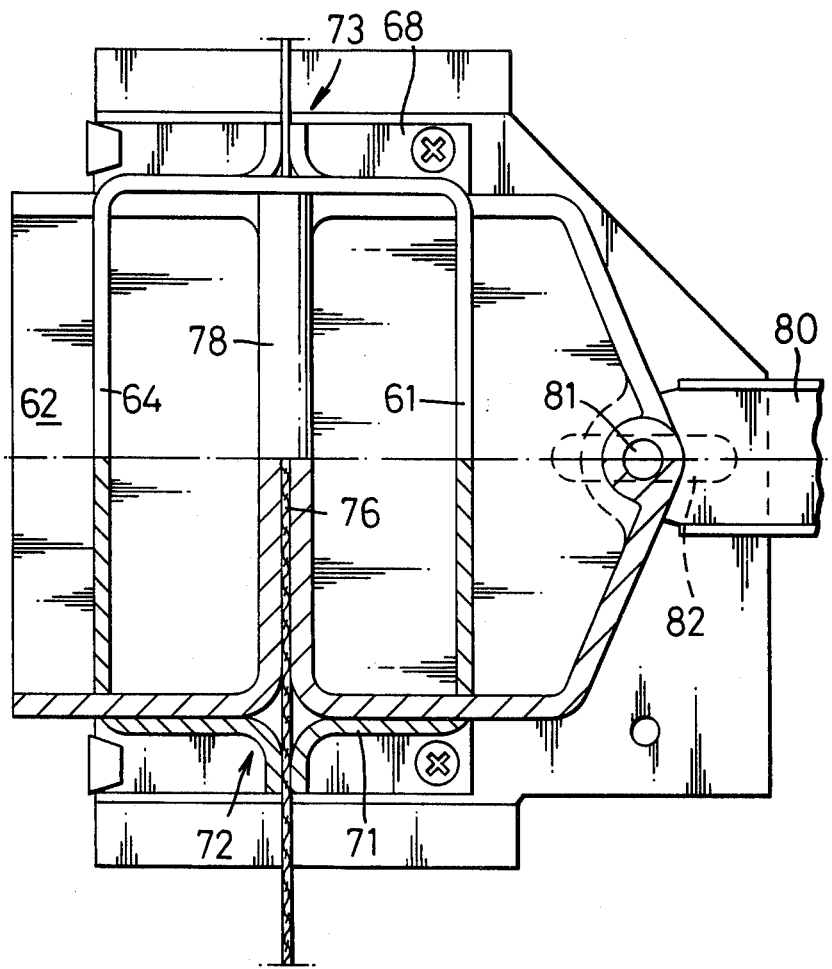
Figure 14:
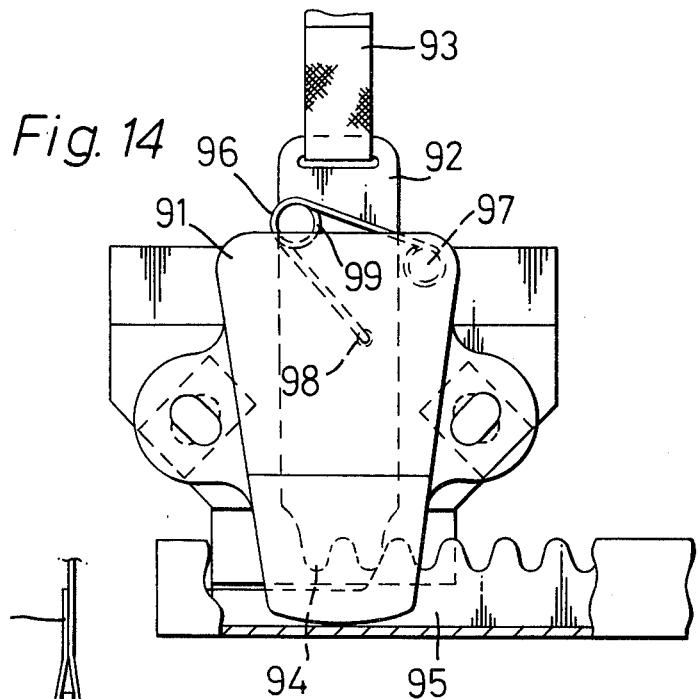
Figure 15:
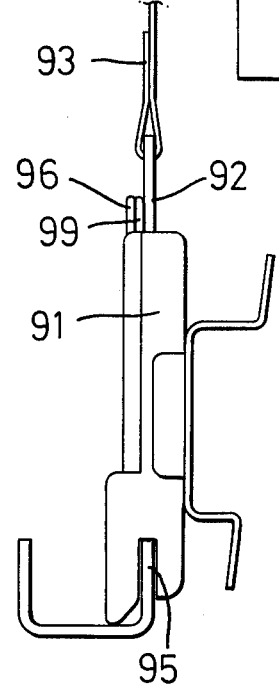

FIG. 2 shows a detail, in perspective, of a latch mechanism used in the assembly of FIG. 1, FIG. 3a shows a part sectional elevation detailing various positions in the sliding roof assembly of FIG. 1, FIG. 3b is a transverse section thereof, FIG. 4 is a detail view, in perspective, of part of a channel section member used in the assembly, FIG. 5 is a sectional elevational view at the rear edge of the closure panel used in the assembly, and FIG. 6 is a detail, in section, showing an outwardly directed flange at the rear of the assembly, FIGS. 7 and 8 are perspective views of respective parts of an actuator for operating spaced latches, FIG. 9 is a perspective view showing a detail of the part of FIG. 7, FIG. 10 is an elevational section through the latch actuator when assembled, FIG. 11 is a plan view, partly in section, of the assembled actuator, FIG. 12 is a section on the line BB of FIG. 10, FIG. 13 is a sectional view, in elevation, of an extension to a handle shown in FIG. 11, FIG. 14 is a plan view of a latching mechanism engaging a rack, and FIG. 15 is an end elevation of the mechanism shown in FIG. 14.

Referring to the drawings, a sliding roof assembly includes an integral support structre 1 which consists of opposed side members 2 and 3, front and rear cross members 4 and 5, and a panel 6, all of which are made as a single-piece pressing. The generally S or Z- shaped cross section of the opposed side members 1, 2 and cross members 4, 5 can be seen at the sectioned portion 7 in FIG. 1. Panel 6 closes off a rear half of the support structure 1. An overlapping panel 8, spaced from panel 6 to define a recess 9, is attached to the side members 2, 3 and the cross member 5. The recess 9 accommodates a closure panel 10 in an "open" position wherein panel 10 uncovers an opening 11 in the assembly 1.

A peripheral flange 12, which bounds the side and cross members 2 – 5, slopes downwardly from a folded edge 13 to a free edge 14. An inwardly directed lip 15, which may consist of straight portions which extend along the sides of members 2 – 5 (but not into the corners of structure 1) is provided for anchoring the structure 1 to a vehicle roof 16. The free edge 14 and the lip 15 are attached to a resilient seal 17 (see also FIG. 6) which is compressed when the structure 1 is fitted to an opening in the roof 16.

A wall 18 depends from the folded edge 13 to a level below the edge 19 of the opening made in the roof 16. An inwardly directed flange 20 projects from the lower edge of the wall 18.

In the front half of the support structure 1, the flange 20 and the front edge of panel 6 are shaped to provide a rim 21 which defines the roof opening 11. Rim 21 lies substantially parallel to the under surface of the closure panel 10 in the closed position.

The closure panel 10 is slidably supported by channel section members 22 adjacent each side member 2, 3. An upper edge of each channel section member 22 includes a plurality of teeth 23 providing engagement for slidable latching plates 24. As shown in FIG. 2, each of the plates 24 is slidably supported in a split housing 25, 26 so that a toothed portion 27 can engage the teeth 23 on the respective channel section member 22. Each latching plate 24 is maintained in engagement with teeth 23 by a wire torsion spring 28 having one arm pivotally connected to a pin 29 secured in part 26 of the split housing. The other arm of spring 28 is anchored in a hole 30 in plate 24. Latching plates 24 are moved towards each other by means of respective lengths of webbing 31 coupled to a common actuator best seen in FIG. 1a. When tension is applied to the webbing 31, initial movement of the latching plate 24 causes the arms of spring 28 to move towards each other. This requires a relatively large force, but once the teeth 27 are disengaged from the teeth 23, the force falls to almost zero as further slidable movement of plate 24 merely causes rotation of spring 28 about pivot 29.

Referring to FIG. 1a, the common actuator 32 for the length of webbing 31 comprises a movable part 33 and a fixed part 34 which is secured to panel 6. The webbing 31, which is continuous, is entrained through slots 35, 36 in the parts 33, 34 whereby relative movement causes the webbing 31 to be effectively shortened thereby withdrawing the latching plates 24 from the teeth 23. The relative movement may be affected by applying rearward pressure to a handle portion 38 of part 33 in the direction of a depending portion 37 containing slot 36.

Further details of the latching mechanism and the actuator 32 are described in our co-pending Japanese application Nos. 43146/75 and 42020/75 respectively.

The closure panel 10 is supported, at each side, on rollers which rest on the upper toothed edge of the channel section members 22. Referring to FIGS. 1, 3a, 3b and 4, the rearmost roller 40, at each side, is mounted on the cranked end of a respective torsion bar 41 which is secured to the upper surface of the panel 10. The cranked ends of the torsion bars 41 are twisted, thereby applying a torgue, when the closure panel 10 is in the closed position over the opening 11. In this position, the end rollers 40 and the other rollers 46 rest on the upper or toothed edge of the respective channel section members 22. When the panel 10 is moved rearwardly towards the open position, the end rollers 40 encounter an aperture 43 and a downwardly directed ramp 44 at an approximately midway position along the length of each of the channel section members 22. The torque stored in the torsion bars 41 serves to deflect the end roller 40 into the aperture 43 and beneath the ramp 44 whereby the rollers then enter the channel section 22 thereby deflecting the closure panel 10 beneath the level of the covering panel 8. The closure panel 10 is thereby accommocated in the recess 9 between the panels 6, 8. The ramp 44 in each channel section member 22 may be formed by cutting and raising a portion of the upper edge which is secured by a triangular bracket 47 as shown in FIG. 4.

FIG. 5 shows a detail of an abutment between a rear portion of the closure panel 10 and the front edge of panel 8. A pair of interengageable, re-entrant flanges 50, 51 are shown closed on a compressible seal 52. This construction locks the closure member 10 in the closed position and improves the strength of the assembly as a whole.

FIG. 6 shows a detail of the flange 12 in a sectional view through the rear cross member 5. As shown in this section, a flat strip 53 with a dished portion 54 extends forwardly from the folded edge 13. The covering panel 8 is located in the dished portion 54 and is secured by, for example, spot-welding. The lip 15 includes a plurality of holes for receiving blind rivets (not shown) fitted from the interior of the vehicle.

The assembly described above is easily fitted to a vehicle such as a saloon car. A hole is cut in the roof 16 of the vehicle to receive the support structure 1 whereby the flange 12 and seal 17 rest on the upper surface of the roof. The structure 1 is then anchored by securing the lip 15 to the edge portions 19 of the roof.

Referring to FIGS. 7–13, an actuator for operating spaced latches comprises a stationary part 61, in the form of an open frame, and a movable part 62 in the form of a plate which is adapted to fit within the frame 61 for relative slidable movement. Sides 63, 64 of frame 61 include slots 65 which receive the respective parallel walls 66, 67 of the plate 62. When frame 61 is fixed, for example, by screws passing through flanges 68, 69, the plate 62 is freely slidable through slots 65 relative to the sides 63, 64.

Sides 70, 71 of frame 61 include laterally extending portions 72, 73 each defining slots 74, 75. These slots are aligned to receive a length of webbing 76 (FIG. 11). The inner corners of portions 72, 73 are rounded to assist slidable movement of the webbing 76. The plate 62 includes a slot 77 which also receives the webbing 76. The slot 77 is backed by a ridge 78 which acts as a handle. The corners of the sides, 62, 67 defining the ends of the slot 77 are rounded to assist slidable movement of the webbing 76.

FIG. 11 shows the assembled actuator in a rest position with the slots 74, 75, 77 aligned. In this position, there is little or no tension in webbing 76 so that it does not operate latches (not shown) connected to its respective ends. However, when the plate 62 is moved relative to the frame 61, by pushing or pulling the handle portion 78, the webbing 76 is drawn within frame 61 and follows a substantially U-shaped path through the slots 74, 75, 77. Thus, the ends of the webbing 76 are drawn together thereby releasing the latches.

An extension 80 may be connected at 81 to the plate 62 for coupling the actuator to an electric drive (not shown). Connection 81 may include a pin located in a guiding slot 82 in an extension joined to side 63 or 64 of frame 61.

FIG. 13 shows an alternative in which a rod 84 is slidably located in a bush 85 secured to a folded extension 86 joined to frame 61.

Referring to FIGS. 14 and 15, a latching mechanism comprises a support 91 for a slidable member 92 to which a length of webbing 93 is attached. Member 93 has a pair of teeth 94 for engaging the teeth in a rack 95. Member 92 is maintained in engagement with the rack 95 by a wire torsion spring 96 having one arm pivotally connected at 97 to support 91 and its other arm anchored in a hole 98 in member 92. Spring 96 extends transversely of the slidable movement of member 92 and preferably includes at least one loop 99 which assists its biasing action.

When tension is applied to the length of webbing 93, member 92 is disengaged from the rack 95, the initial movement of the member causing the arms of spring 96 to move towards each other. This requires a relatively large force, but once the teeth 94 are disengaged from rack 95, the force falls to almost zero as further slidable movement of member 92 merely causes rotation of spring 96 about pivot 97.

When the latching mechanism is used in a sunshine roof, the latches may be disengaged without imparting a force which accelerates the roof following disengagement.

What we claim is:

1. A sliding roof assembly for insertion in an opening in a vehicle roof, comprising:
   a support structure, said structure being a single piece pressing in the shape of a rectangular frame, said frame having an opening defined by a pair of opposed side members and front and rear cross members;
   a rear half of said frame opening being closed off by a first panel, said first panel being integral with said side members and said rear members;
   said frame being peripherally bounded by a flange which is integral with and projects outwardly from said members and said front and rear members;
   said flange including an upstanding edge which is defined by a first wall which projects downwardly into the frame opening and a second wall which slopes downwardly to a free edge on each side of said frame, each of said free edges also being defined by an inwardly projecting lip which is provided to rest on the upper surface of the vehicle roof when the support structure is fitted thereto, said inwardly projecting lip being a straight member and having holes for receiving concealed rivets;
   a second panel secured to the support structure in overlapping but spaced relationship with the first panel to define a recess therebetween; and,
   a closure panel slidably mounted within the support structure and movable between a closed position, in which it closes the frame opening in the front half of said frame, and an open position in which it lies in the recess between said first and said second panels.

2. An assembly according to claim 1 wherein an integral flange projects inwardly from the lower edge of said first wall to improve the strength of the integral support structure and to improve the interior finish.

3. An assembly according to claim 2 wherein the inwardly directed flange is shaped to provide a peripheral rim defining the opening in the front half of the support structure, which rim is substantially parallel to the closure panel when it is in the closed position.

4. An assembly according to claim 3 wherein the closure panel is slidably supported by channel section members attached to the opposed side members of the integral support structure.

5. An assembly according to claim 4 wherein a midportion of each of the channel section members is cut and turned up to define a ramp adjacent the inner edge of the first panel whereby the closure panel, which is supported on rollers, is guided into the channel section members when it is moved from the closed to the open position.

6. An assembly according to claim 5 wherein the rollers are attached to the first panel by resilient means, such as a torsion spring, which is biased when the closure panel is moved from the open to the closed position.

7. An assembly according to claim 6 wherein the rear edge of the closure panel and the inner edge of the first panel comprise interengageable re-entrant flanges which lock the closure panel in the closed position and which also strengthen the roof assembly.

8. An assembly according to claim 7 wherein a compressible seal is included which is compressed between the re-entrant flanges when the closure panel is closed.

9. The assembly of claim 1, wherein said pressed frame has a substantially S-shaped cross section.

* * * * *